UNITED STATES PATENT OFFICE.

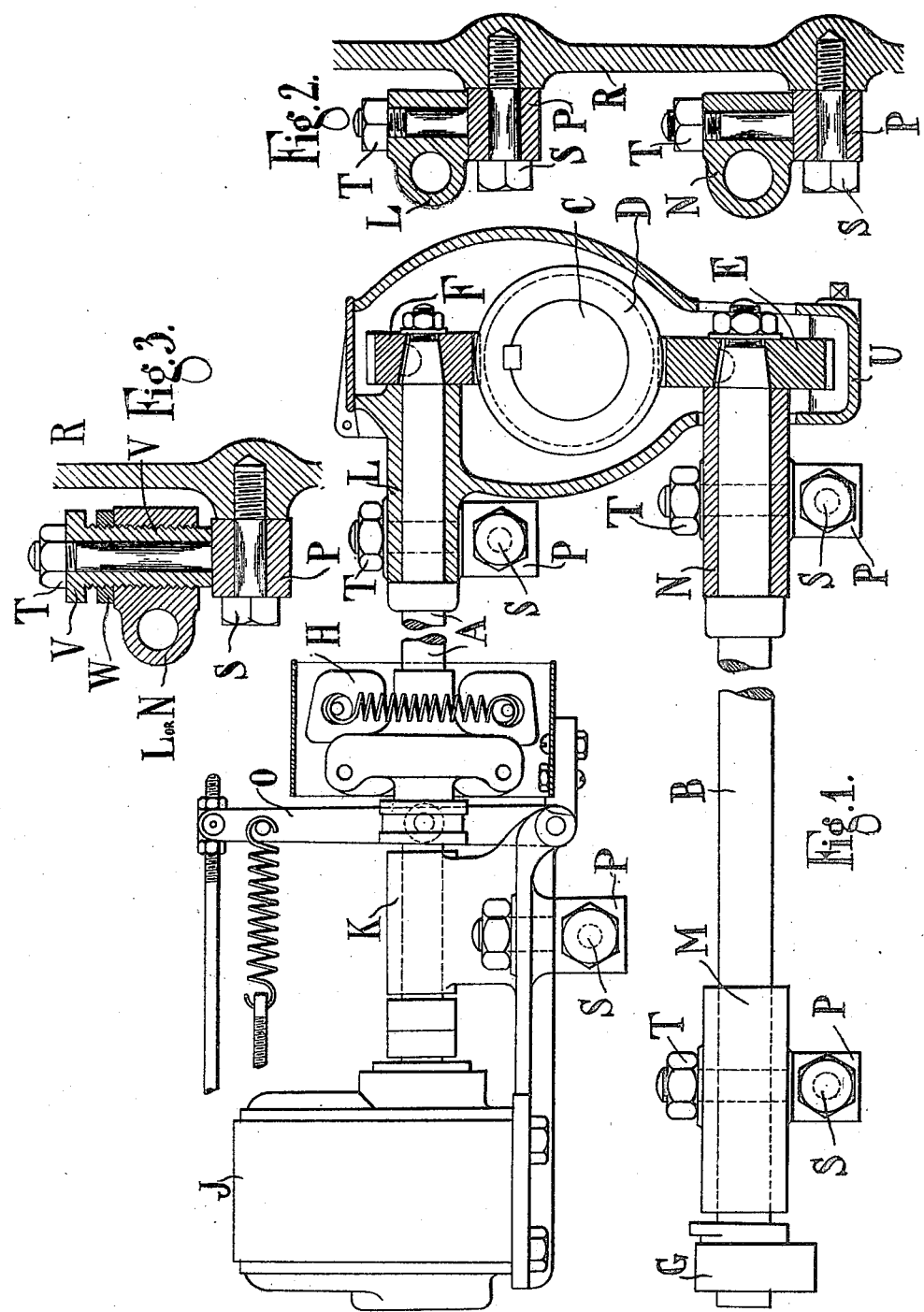

WILFRED LE PLASTRIER WEBB AND KENNETH IRWIN CROSSLEY, OF OPENSHAW, MANCHESTER, ENGLAND.

FOUR-CYCLE INTERNAL-COMBUSTION ENGINE.

1,407,453. Specification of Letters Patent. Patented Feb. 21, 1922.

Application filed November 3, 1921. Serial No. 512,668.

*To all whom it may concern:*

Be it known that we, WILFRED LE PLASTRIER WEBB and KENNETH IRWIN CROSSLEY, subjects of the King of Great Britain and Ireland, and residents of Openshaw, Manchester, England, have invented certain new and useful Improvements in or Relating to Four-Cycle Internal-Combustion Engines, of which the following is a specification.

Our invention relates to the arrangement of driving gear for operating the cams, the governor and the electric ignition apparatus of internal combustion engines, and to means for facilitating the quick assembly and alignment of the bearings which carry the operating shafts and other parts.

In accordance with our invention, the crank shaft is provided with a single worm pinion which drives two shafts, at different speeds, each through another separate worm wheel. One of these two shafts which we will call the cam shaft, carries the cam or cams for operating the admission and exhaust valves, and is driven at half the speed of the crank shaft. The other shaft, which we will call the governor shaft, is driven at the same speed as the engine and is used for driving a centrifugal governor for controlling the fuel supply by means of a throttle valve or other mechanism and also in the case of engines with electric ignition, for driving a magneto machine, distributor or commutator. The cam shaft and governor shaft may lie in any position suitable for being driven by the crank pinion but we prefer them to lie parallel with each other, with their worm wheels on opposite sides of the pinion on the crank shaft.

Each end of both the cam shaft and the governor shaft is mounted in a bearing which is self-aligning. At their driven ends these two shafts are also capable of easy adjustment in regard to the relative depth in gear of the teeth of the driving pinion and driven worm wheels and are preferably arranged so that the governor shaft bearing is either made in one with or carries in a separate part a combined wheel, guard and oil bath which protects the wheels and enables them to run silently and be continuously lubricated.

The self-aligning bearing of the governor shaft at the end farthest from the crank shaft carries the fulcrum lever through which the governor operates the fuel regulating mechanism, and, when electric ignition is used, also carries the bracket on which the magneto machine, distributor or commutator is mounted.

Each of the self-aligning bearings are made, for preference, in the following manner:—A bolt is made with a deep square head and with a hole drilled through this square head at right angles to the axial centre line of the bolt. A stud or set-screw is then passed through the bolt head to secure it to the engine frame or part to which it is to be fitted, with the shank of the bolt in a plane perpendicular to the plane in which lies the shaft to be carried. The bracket of the shaft to be carried has two holes in it, the axes of which lie in planes perpendicular to each other. The shank of the bolt is passed through one hole and the shaft to be carried is passed through the other hole and a nut or collar used to secure the bracket to the bolt. The axis of the shaft can then lie in any direction to suit the other end of the shaft, the bracket for this other end being carried in a similar manner. Each of the two bearings of the shaft are then self-aligning and can be arranged to remain continuously in that state and, if suitable screws or nuts are used can be securely fastened in the self-aligning position.

When arranged and operated in this way, the cam shaft and governor shaft with their respective driving wheels and bearings, the governor and the electric ignition apparatus for say, a five brake horse power engine, can be attached to the engine and adjusted in position ready for working within ten minutes. This is a very considerably less time than any alternative and equally satisfactory arrangement within our knowledge.

Furthermore, the arrangement is both simple and inexpensive since all the parts are suitable for being produced in large quantities in simple operations.

Our invention can be applied to engines having one or more cylinders.

Our invention is illustrated by means of a drawing in which Figure 1 is a front elevation, partly in section; Fig. 2 is a transverse vertical sectional view; and Fig. 3 is a transverse vertical sectional view of a modification.

In the drawing, A is the governor shaft and B the cam shaft of a horizontal four cycle engine, the crankshaft being shown at C. A worm D on the crank shaft drives the horizontal cam shaft B at half the speed of the crankshaft by means of a worm wheel E, and drives the horizontal governor shaft A at the same speed as the crankshaft by means of the worm wheel F. A cam for operating an exhaust valve and, if desired, an air admission valve is shown at G. A centrifugal governor driven by the governor shaft A is shown at H together with a governor lever O to operate a throttle valve or other part to be controlled. A magneto electric machine for producing electric current for ignition purposes and which is driven by the same shaft is shown at J.

Each end of each of the shafts A and B is supported in a self-aligning bearing as shown at K, L, M and N, the bearing K having mounted on it the governor lever O and the magneto J. Each of these bearings is supported on a vertical swivel bolt P, the head of which is preferably square and which in turn is secured to the frame R of the engine by means of a screw S. The governor lever O and the magneto J are mounted on a bracket forming part of the bearing K.

It will be seen that the two shafts A and B are able to adjust themselves freely without any accurate fitting, and as soon as they are in position the nuts T can all be tightened up and the screws S then also tightened up, and the whole gearing is at once securely fixed.

A combined wheel guard and oil bath is shown at U to enable the gears to be efficiently lubricated and protected. In the drawing, this guard is mounted directly on the governor shaft bracket L, but it might equally well be mounted on the cam shaft bearing N.

If it is desired to be able to adjust the worm wheels E and F relatively to the worm C, so as to put the teeth of the wheels further in or out of gear, either of the bearings L and N may be arranged as shown in Figure 3 in which the bearing is adjustable vertically to set the worm wheel further in or out of gear with the driving worm by means of the screw V which after adjustment may be locked in position by the nut T and further locked, if required, by means of the nut W.

It should be understood that the shaft B which we have described as a cam shaft may equally well be called an eccentric shaft if an eccentric is used for operating the valves instead of a cam.

We claim:—

1. The combination with an engine frame, of a plurality of axles carried by the frame and arranged in spaced relation, bolts having apertured heads swiveled on said axles, bearings mounted on said bolts and having aligned bores, the axes of said bores being arranged in a plane at right angles to the axes of said bolts, and a driven shaft mounted in said bores.

2. A combination as claimed in claim 1, in which said axles are formed of screws detachably engaging the engine frame.

3. A combination as claimed in claim 1 in which one of the bearings mounted on one of said bolts includes a bearing member, having a threaded aperture, a sleeve having exterior threads engaging the threads of said aperture, and said sleeve being mounted on the last mentioned bolt.

4. The combination with an engine casing, of a plurality of swiveled bearings detachably connected to said casing, a pair of shafts supported by said bearings, and means for moving certain of said bearings toward or away from one another for adjusting the axes of said shafts.

5. The combination with an engine frame, of two pairs of screws mounted on the engine frame, a pair of bolts having apertured heads mounted on each pair of screws, a pair of bearings swiveled on each pair of bolts, and a shaft carried by each pair of bearings.

6. A combination of the kind defined by claim 5 in which one of the bearings of each pair has a threaded aperture, and a threaded sleeve arranged in said aperture and mounted on one of said bolts.

In testimony whereof we have signed our names to this specification.

WILFRED LE PLASTRIER WEBB.
KENNETH IRWIN CROSSLEY.